United States Patent
Bollengier (10) Patent No.: US 8,413,837 B2
(45) Date of Patent: Apr. 9, 2013

(54) ENHANCED SERVING APPARATUS

(75) Inventor: Jeff Bollengier, Brentwood, CA (US)

(73) Assignee: Simple Wave LLC, Redwood City, CA (US)

( * ) Notice: Subject to any disclaimer, the term of this patent is extended or adjusted under 35 U.S.C. 154(b) by 0 days.

(21) Appl. No.: 12/289,676

(22) Filed: Oct. 31, 2008

(65) Prior Publication Data

US 2009/0108004 A1 Apr. 30, 2009

Related U.S. Application Data

(60) Provisional application No. 60/984,350, filed on Oct. 31, 2007.

(51) Int. Cl.
*B65D 25/00* (2006.01)

(52) U.S. Cl. ........ 220/669; 220/574; 220/694; 426/115; 426/389

(58) Field of Classification Search .......... 220/669, 220/573.1, 675, 574, 698, 694, 696, 695, 220/608, 623; 428/35.7, 34.1; 426/112, 426/115, 389
See application file for complete search history.

(56) References Cited

U.S. PATENT DOCUMENTS

| | | | |
|---|---|---|---|
| 879,364 A * | 2/1908 | Cohen | 220/574 |
| 1,220,495 A * | 3/1917 | Cadby | 220/574 |
| D171,498 S * | 2/1954 | Hensley | D7/584 |
| 2,669,379 A * | 2/1954 | Olson | 220/574 |
| 2,757,525 A * | 8/1956 | Marsala | 220/574 |
| RE24,575 E * | 12/1958 | DiCostanzo | 220/574 |
| D192,297 S * | 2/1962 | Klier | D30/129 |
| D226,674 S | 4/1973 | Bruno | D44/15 K |
| 3,745,290 A * | 7/1973 | Harnden et al. | 219/621 |
| 4,093,041 A * | 6/1978 | Davis et al. | 186/45 |
| 4,880,951 A * | 11/1989 | Levinson | 219/733 |
| 5,065,889 A * | 11/1991 | Conti | 220/360 |
| 5,082,140 A * | 1/1992 | Swenson | 220/669 |
| 5,172,826 A * | 12/1992 | Celaya | 220/574 |
| 5,292,028 A * | 3/1994 | Patterson et al. | 220/574 |
| 5,366,103 A * | 11/1994 | Abernathy et al. | 220/23.83 |
| 5,419,454 A * | 5/1995 | Stowell et al. | 220/574 |
| D409,448 S * | 5/1999 | Hudson et al. | D7/543 |
| 5,913,445 A * | 6/1999 | Fujii et al. | 220/574 |
| 6,010,027 A * | 1/2000 | Fujii et al. | 220/592.2 |
| 6,018,883 A * | 2/2000 | Mulhauser | 34/58 |
| 6,135,307 A * | 10/2000 | Fahy | 220/574 |
| 6,382,459 B1 * | 5/2002 | Liu | 220/769 |
| 6,416,828 B1 * | 7/2002 | Miyazaki et al. | 428/34.1 |
| 6,431,389 B1 * | 8/2002 | Jerstroem et al. | 220/574.3 |
| 7,086,580 B2 * | 8/2006 | Liou | 229/407 |
| RE39,391 E * | 11/2006 | Jerstroem et al. | 220/574.3 |
| 2004/0099149 A1 * | 5/2004 | Morgan | 99/426 |
| 2006/0243141 A1 * | 11/2006 | Mayer et al. | 99/495 |
| 2007/0039966 A1 * | 2/2007 | Schantz et al. | 220/574 |

OTHER PUBLICATIONS

International Search Report and Written Opinion for Application No. PCT/US09/02282, dated Jan. 13, 2010 (mailing date), 10 pp.

* cited by examiner

*Primary Examiner* — Mickey Yu
*Assistant Examiner* — Kareen Rush
(74) *Attorney, Agent, or Firm* — Kramer Levin Naftalis & Frankel LLP (57) ABSTRACT

A technique for allowing the convenient and orderly withdrawal of contents is disclosed. An apparatus according to the technique may include a container which includes an enhancement at the rim of the container. The enhancement provides the functionality to move edible and/or inedible substances onto objects. In one example, the enhancement may protrude inwardly as a smoothed surface that may push substances onto objects as the objects are removed from the container.

8 Claims, 10 Drawing Sheets

ENHANCED SERVING APPARATUS

CROSS-REFERENCE TO RELATED APPLICATIONS

This application claims benefit of U.S. Provisional Patent application No. 60/984,350, filed Oct. 31, 2007, which is incorporated herein by reference.

BACKGROUND

Food is a central part of many cultures, particularly so in the United States where many enjoy good food, friends and family. Individuals are often found gathering around a variety of social foods including chips and guacamole. Culturally, the interaction with the food brings groups together.

Salsa, guacamole, dip, and other edible substances are often provided in bowls, plates or other serving mediums. Individuals consume the edible substances using chips, bread, crackers, or other objects. Unfortunately for many individuals who prefer to consume ample amounts of salsa per tortilla chip, it is often difficult to successfully scoop adequate amounts of salsa onto the tortilla chip without having portions of the salsa slip off the edges of the tortilla chip. Unsuccessful attempts often force individuals to resort to unsanitary methods such as using their fingers or inconvenient methods that require the use of secondary objects like spoons or other objects in order to push the salsa onto a tortilla chip.

What is needed is an apparatus and/or enhancement that allows for the convenient and orderly withdrawal of contents. In one example, the apparatus may serve edible substances and assist individuals to scoop ample amounts of edible substances onto objects. What is further needed is a system and method of manufacturing that may be used to produce an apparatus and/or enhancement which facilitates the convenient and orderly withdrawal of contents.

The foregoing examples of the related art and limitations related therewith are intended to be illustrative and not exclusive. Other limitations of the related art will become apparent to those of skill in the art upon a reading of the specification and a study of the drawings.

SUMMARY OF THE INVENTION

The following embodiments and aspects thereof are described and illustrated in conjunction with systems, tools, and methods that are meant to be exemplary and illustrative, not limiting in scope. In various embodiments, one, or more of the above described problems have been reduced or eliminated, while other embodiments are directed to other improvements.

A technique for allowing the convenient and orderly withdrawal of contents involves an enhancement provided on an apparatus. An example of an apparatus according to the technique includes an enhanced apparatus that provides the functionality to move edible and/or inedible substances onto objects. In various examples, the enhancement may be found on the inner surface of a bowl, plate, dish or other serving medium. In one embodiment, the enhancement is a projection that extends inward from the side towards the center of the apparatus; the projection may be located along the upper edge of the side. In one example, the enhancement may protrude inwardly in as a smoothed surface that may push edible substances onto objects as they are dished out of the serving medium. Advantageously, an individual may easily obtain a desired amount of substance using the enhancement. In other embodiments, the apparatus is used to contain non-edible materials; such materials may be liquid or solid. The enhancement of the apparatus serves to make the apparatus spill-resistant. In some embodiments, the apparatus contains liquid non-edible contents, and may be used to mix the liquid non-edible contents while minimizing or eliminating the risk of spilling of the contents while they are being mixed. In some embodiments, such liquid contents are dyes or other colored products. In other embodiments, the apparatus is a larger container, wherein the enhancement functions to minimize or eliminate spillage due to, e.g., waves or splashing in the container. In some embodiments, the larger container is a bathtub or pool. In yet other embodiments, the apparatus is used contain solid non-edible materials. In some such embodiments, the apparatus is used to contain small solid items, and the enhancement facilitates removal of the small solid items, while minimizing the risk of dropping the small items as they are being removed. In some embodiments, such small items include, e.g., nails, screws, bolts, nuts and beads. As is apparent from this description, the apparatus of the present invention is not limited to use in any one setting, but may be advantageously used in any number of contexts.

In alternate embodiments, the apparatus may be a container including a base, a side and an enhancement. The base may be formed at a center of a substantially horizontal portion. The side may extend from one face of the substantially horizontal portion. The enhancement may be formed along the side and extend toward the center of the container. As a result, the container includes an apparatus for allowing the convenient and orderly withdrawal of contents. The container may also include a lid.

In further embodiments, the enhancement may be formed at an angle of about 30 to 150 degrees relative to a plane perpendicular to the base. In additional embodiments, the enhancement is detachable from the container. In other embodiments, the enhancement may be formed inwardly more than 1 centimeter from the side of the container. In another embodiment, the enhancement may be a rim, and the rim may extend at an angle of between about 30 and 150 degrees. Moreover, the container and/or the enhancement can be fabricated using a variety of materials, including, but not limited to ceramic, glass, organic polymers, polyethylene, polypropylene and/or any other convenient and or known materials that may be suitable for such a technique.

In another example, an apparatus for injection molding may be used to fabricate the container and/or enhancement. The apparatus may include a mold. The mold may include a cavity side and a core side, with a trapped cavity space between the cavity side and the core side. In one example the cavity side may include a gate for injection of a material and the core side may include an air poppet. Furthermore, the core side may be movable with relation to the cavity side. In one embodiment, the trapped cavity space may define the shape of a container. The container may include a base and a wall. The thickness of the wall may vary such that it may have a first thickness closest to the base, a second thickness further away from the base, and a third thickness at the end of the wall distal to the base. In one example, the third thickness may be the largest thickness and the second thickness may be the smallest thickness and the wall may have a greater degree of curvature on the inside surface than on the outside surface; in some embodiments, the inside surface has a degree of curvature while the outside surface is essentially straight (i.e., without curvature).

Advantageously, the proposed apparatus, systems and methods provide for an enhancement that allows for the convenient and orderly withdrawal of contents. For example, an apparatus that contains food may have an enhancement around the rim of the container which allows a user to obtain the food from the container in a precise manner. These and other advantages of the present invention will become apparent to those skilled in the art upon a reading of the following descriptions and a study of the several figures of the drawings.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
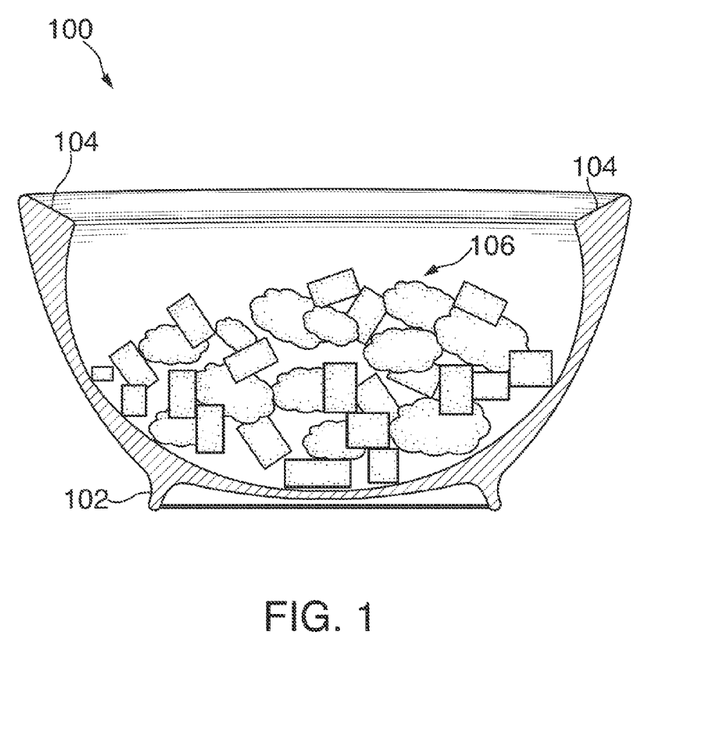
FIG. 1 depicts a diagram of an example of a cross-section of a serving apparatus.

FIG. 1 depicts a diagram 100 of an example of a cross-section of a serving apparatus. FIG. 1 includes serving apparatus 102, enhancement 104, and edible substance 106.

Serving apparatus 102 may be any serving device, bowl, tray, cup, plate, tin, or other known and/or convenient device for serving or preparing edible substances. The serving apparatus 102 may be formed of or include organic polymers, polyethylene, polypropylene, titanium dioxide, mineral filler, polypropylene, ceramic, glass, tin, aluminum, steel, cast-iron, wood, or any known and/or convenient material for serving or preparing edible substances. The serving apparatus may be cast, injection molded, carved, blown, or created through any known and/or convenient manner. The serving apparatus may be round, square, rectangular, or any shape known and/or convenient. The serving apparatus may have a substantially horizontal portion or base, and a wall or side extending vertically or at an angle from the substantially horizontal portion or base. The wall or side may extend from the base at any suitable angle such as an angle in the range of about 10 to 100 degrees relative to the horizontal. In some embodiments, the wall or side do not extend from the base at a sharply defined angle, but instead with a gradual and/or curved transition from the base.

The enhancement 104 may be formed on any portion of the wall or side, and may be formed at the rim. The enhancement may be formed inwardly from the wall or side, and may be formed with the wall at an angle producing a curved surface from the wall to the innermost point of the enhancement. In one embodiment, the angle may be of the range between about 30 and 150 degrees.

In one embodiment the edible substance 106 may be any food, including, but not limited to guacamole, salsa, and dip. In other embodiments, the edible substance 106 may be any fluid of elevated viscosity, including but not limited to honey, oils, syrups, and sauces.

In one example, a user may place contents, such as an edible substance 106, inside the serving apparatus 102. In order to facilitate the convenient and orderly withdrawal of those contents, a user would drag the contents along the side of the serving apparatus until it reached the enhancement 104. The enhancement would cause the contents to fall back on to the mechanism that is being used to withdraw the contents. For example, if a user is withdrawing salsa using a tortilla chip, the salsa would fall back on to the tortilla chip when it reached the enhancement 104 thereby facilitating the convenient and orderly withdrawal of the contents. In another example, a spoon may be used to withdraw the edible substance 106 and the enhancement 104 would cause the edible substance 106 to fall back onto the spoon.

Figure 2:
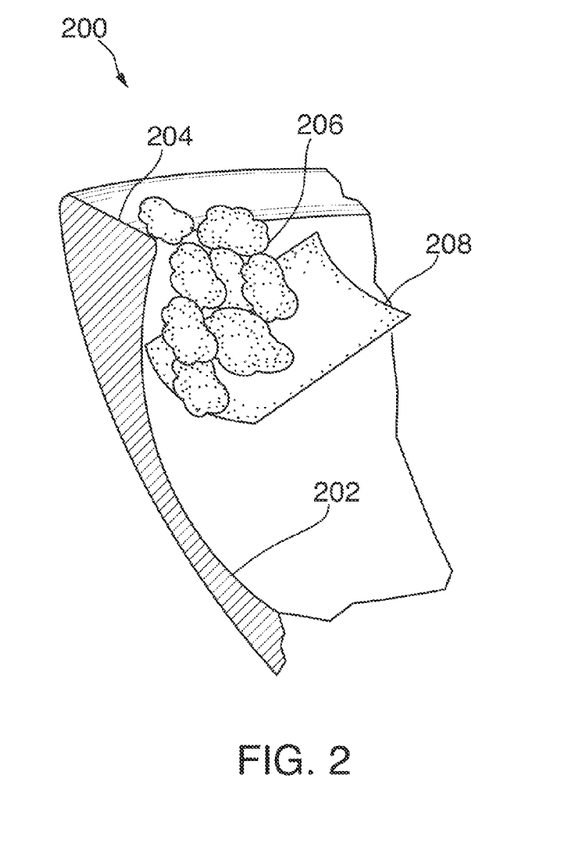
FIG. 2 depicts a diagram of an example of a serving apparatus in use.

FIG. 2 depicts a diagram 200 of an example of a serving apparatus in use. FIG. 2 includes side of serving apparatus 202, enhancement 204, edible substance 206, and object 208.

The side of serving apparatus 202 may be any side of a serving apparatus of any shape. The side of serving apparatus 202 may be continuous, such as in a circular bowl, or may be a single edge such as is found in a square or rectangular dish. In one embodiment, the side of serving apparatus 202 may be at any angle in the range of about 5 to 160 degrees relative to the horizontal axis.

The enhancement 204 may be formed on the side of serving apparatus 202, and may be formed at the rim. The enhancement may be formed inwardly toward the center of the apparatus from the side of serving apparatus 202, and may be formed with the wall at an angle producing a curved surface from the side of serving apparatus 202 to the innermost point of the enhancement. The angle may be of the range between about 30 and 150 degrees.

In one embodiment, an object 208 may be used. Objects may include chips, bread, crackers, or other food related items. In a non-limiting illustration, tortilla chips are examples of objects. Objects are not necessary to the enhanced apparatus; they are merely illustrative examples of one of the many possible uses of the enhanced apparatus. For instance, in other embodiments, the objects may be spoons, forks, or any other commonly known silverware.

An illustrative example of the enhanced apparatus depicted in FIG. 2 is use in a football party setting where the main source of food is often tortilla chips paired with various bowls of salsa, guacamole, and dips. As each hungry guest grabs a serving bowl, he or she is eager to stack as much guacamole onto his or her tortilla chip as possible before passing the bowl to the next person. This rushed process is often difficult without the additional help of using of one's fingers. The process is made even more difficult if the hungry guest experiences the inevitable situation of eventually picking an irregularly shaped or undersized tortilla chip. In all situations, enhancement 204 will greatly assist any person trying to stack adequate amounts of guacamole onto his or her chip because the enhancement causes the guacamole to fall onto the chip instead of falling outside of the bowl or off of the chip.

Enhancement 204 serves as a support mechanism that props up edible substances that have been pressed against it. With this support, the likelihood of collapse is minimized. An individual is then enabled to easily stack ample amounts of edible substances onto an object.

Figure 3:
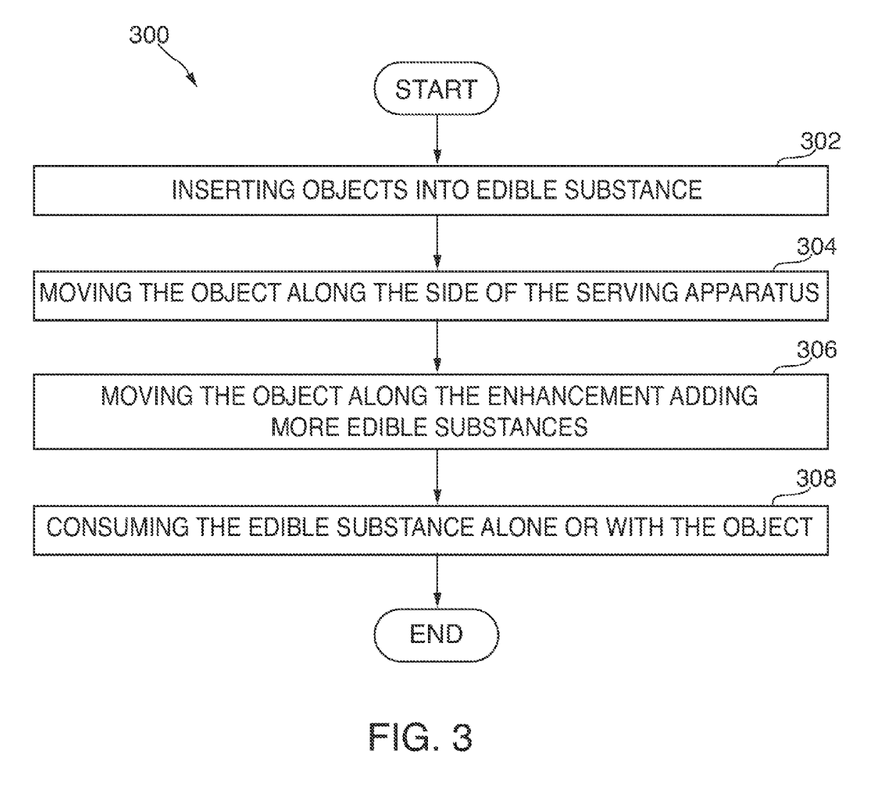
FIG. 3 depicts a flowchart of an example of a method for using a serving apparatus.

FIG. 3 depicts a flowchart 300 of an example of a method for using an enhanced apparatus. The method is organized as a sequence of modules in the flowchart 300. However, it should be understood that these and modules associated with other methods described herein may be reordered for parallel execution or into different sequences of modules.

In the example of FIG. 3, the flowchart starts at module 302 with inserting objects into edible substance. Inserting may involve dipping, scooping, or otherwise inserting the object into the edible substance.

In the example of FIG. 3, the flowchart continues to module 304 with moving the object along the side of the serving apparatus. The moving may be scraping, sliding, or otherwise directing the object along the side of the serving apparatus. Edible substances may build up on the side of the serving apparatus and on the object while doing so.

In other examples, the contents are not edible. For instance, the enhancement may be detachably attached to a container of cement. The user may then drag the cement up to the enhancement with a shovel. Once the cement reaches the enhancement, the excess cement, which would have fallen off of the shovel, is pushed back on the shovel by the enhancement. As a result, the detachable enhancement facilitates the convenient and orderly withdrawal of contents.

In the example of FIG. 3, the flowchart continues to module 306 with moving the object along the enhancement adding more edible substances. Moving may involve scraping, sliding, or otherwise pulling the object along the side of the enhancement. The enhancement may push the edible substance onto the object.

In the example of FIG. 3, the flowchart continues to module 308 with consuming the edible substance alone or with the object. Consuming the edible substance with the object may enhance the original flavor of an object. In one example, an object, like a tortilla chip, may have its plain flavor enhanced into a spicy tomato, onion, and corn flavor with the addition of an edible substance like salsa.

In other embodiments, individuals may only want to consume the edible substance by itself. In this case the object may be an eating utensil object. These objects include but are not limited to eating utensils like spoons, forks, and chopsticks.

In additional embodiments, individuals may want to easily push ample amounts of edible substances onto food preparation objects for cooking purposes. These food preparation objects include but are not limited to cooking utensils like spatulas, cooking spoons, scoops, ladles, and risotto paddles.

Figure 4:
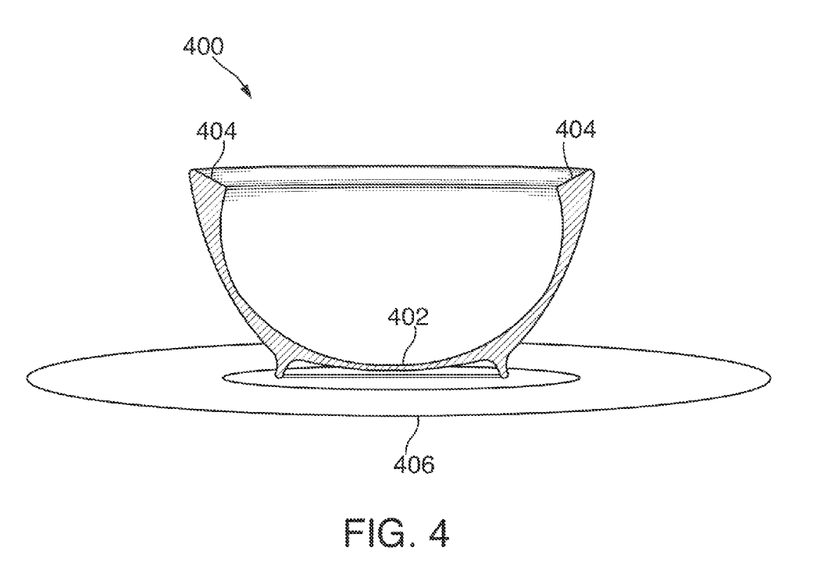
FIG. 4 depicts a diagram of an example of a serving apparatus having an objects storage location.

FIG. 4 depicts a diagram 400 of an example of an enhanced apparatus having an objects storage location. FIG. 4 includes serving apparatus 402, enhancement 404, and objects storage device 406.

The serving apparatus 402 may be a serving apparatus as discussed in reference to FIG. 1 or FIG. 2 and the enhancement 404 may be an enhancement as discussed in reference to FIG. 1 or FIG. 2.

The objects storage device 406 may be a plate, tray, dish, or other device for storing objects. The serving apparatus 402 may be coupled to the objects storage device 406. The serving apparatus 402 and the objects storage device 406 may be created as one piece, such as by injection molding, ceramic manufacturing or any known or convenient process.

In one example, the objects storage device 406 is a plate that is used for storing objects such as tortilla chips. Having an objects storage device, like a plate of chips, attached to a serving apparatus, like a bowl of guacamole prevents the frustration of receiving a bowl of guacamole, without being able to find any tortilla chips to eat it with. Nevertheless, an objects storage device is not necessary to the enhanced apparatus.

Figure 5:
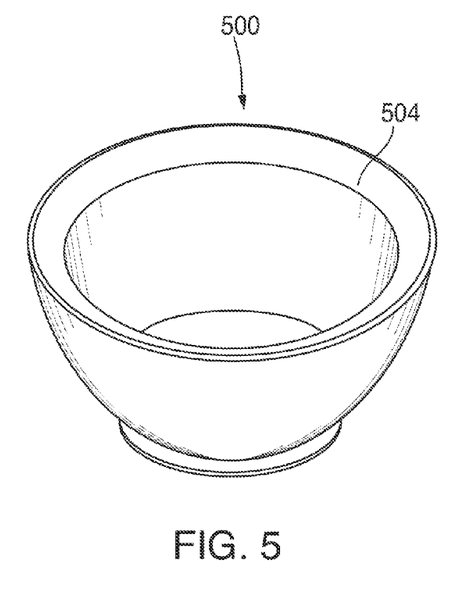
FIG. 5 depicts a diagram of an example of a bowl including an enhancement.

FIG. 5 is a perspective depiction of a bowl including an enhancement. The bowl 500 may be formed of or include polyethylene, polypropylene, titanium dioxide, mineral filler, polypropylene, ceramic, glass, tin, aluminum, steel, cast-iron, wood, any organic polymer, or any known and/or convenient material for serving or preparing edible substances. The bowl may be cast, injection molded, carved, blown, or created through any known or convenient manner. This bowl has a substantially horizontal portion or base, and a wall or side extending vertically or at an angle from the substantially horizontal portion or base. The wall or side extends from the base at any suitable angle such as an angle in the range of about 10 to 100 degrees relative to the horizontal. As shown, the wall may include a rim.

The enhancement 504 is formed on a portion of the wall or side, and is formed at the rim. The enhancement is formed inwardly from the wall or side at an angle producing a curved surface from the wall to the innermost point of the enhancement. The angle may be of the range between about 30 and 150 degrees.

In additional embodiments, the enhancement 504 is detachably attached to the bowl 500, or any other apparatus that may contain contents. In one embodiment, the enhancement 504 is at such a curvature that allows for the convenient and orderly withdrawal of contents on a large number of apparatus that may contain contents. The enhancement 504 may then be attached to those apparatuses by wrapping the enhancement 504 around the rim of the bowl and attaching it to the bowl using an adhesive. Alternatively, the enhancement 504 may be attached to itself such that a seal is provided between the enhancement 504 and the bowl. In this case, the bowl may enjoy the benefit of the technique disclosed herein without having to be manufactured with the enhancement.

Figure 6:
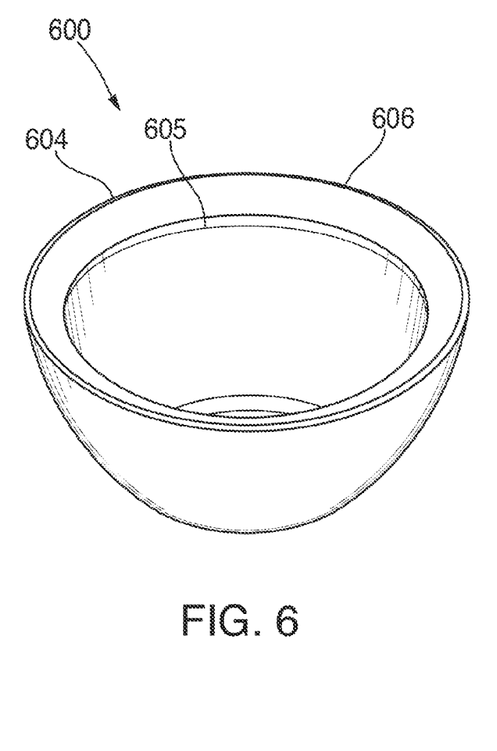
FIG. 6 depicts a diagram of an example of a serving apparatus including an enhancement.

FIG. 6 depicts a diagram 600 of an example of a serving apparatus including a detachable enhancement 604. Detachable enhancement 604 is attached at the rim of the serving apparatus. The detachable enhancement protrudes inwardly from the wall at an angle producing a curved surface 605. On the outer edge of the detachable enhancement there is an additional outer lip 606. This outer lip enables a lid to effortlessly snap onto the serving apparatus for storage purposes. Separating the detachable enhancement from the serving apparatus allows the serving apparatus to be used alone. The detachable feature also enables easier cleaning of both pieces. Having a detachable enhancement also allows different sizes of enhancements to be attached. For example, if the substance is high viscosity fluid, the enhancement only needs a small curved surface to adequately assist a user. On the other hand, if the substance is of low viscosity, an enhancement with a large curved surface is ideal.

Figure 7A:
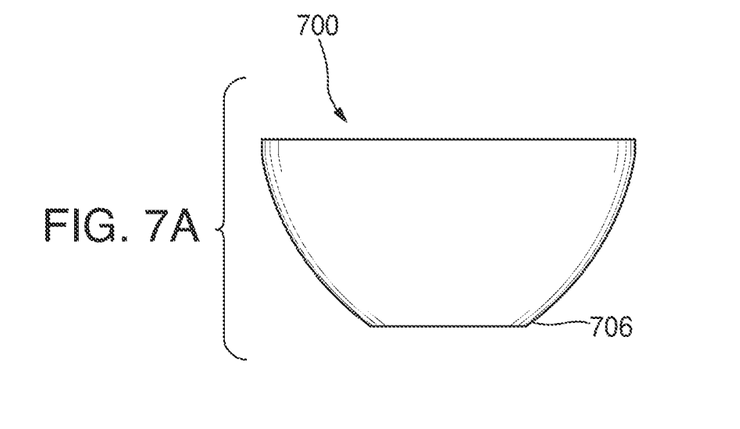
FIGS. 7A and 7B depict a diagram of an example of a serving dish including an enhancement.
Figure 7B:
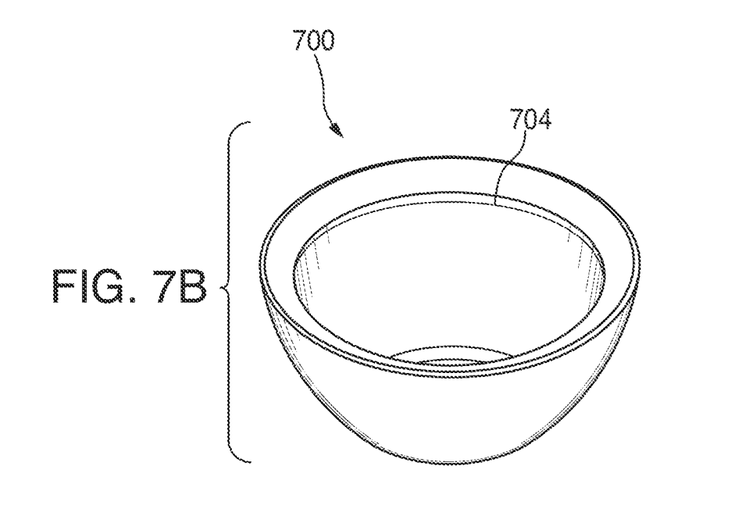

FIGS. 7A and 7B depict a diagram 700 of an example of a serving dish including an enhancement 704 and a detachable base 706. FIG. 7A depicts a profile view of a serving dish having a detachable base 706. The detachable base 706 is attached at the bottom of the serving dish. FIG. 7B depicts a serving dish seen from a perspective view, showing the enhancement 704. In other embodiments, the detachable base may be perforated, allowing excess fluid to drain from the contained substances. Having a detachable base allows for easy cleaning and the option of attaching different bases.

Figure 8:
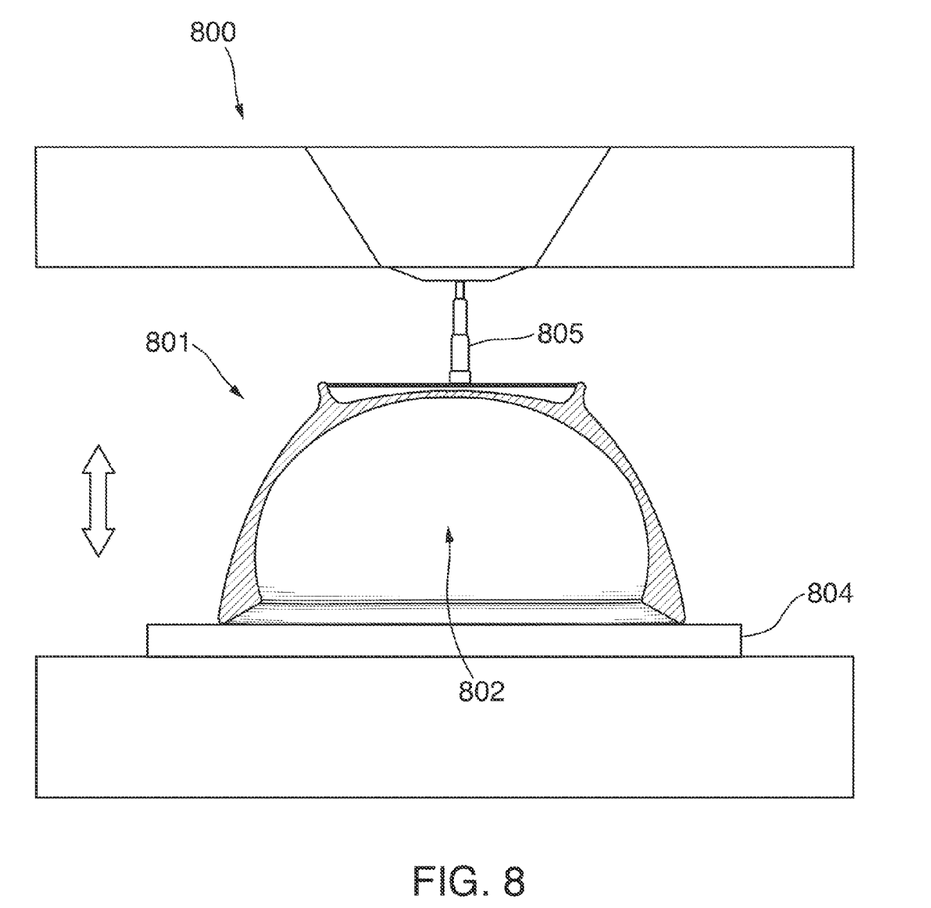
FIG. 8 depicts a diagram of an apparatus for manufacturing a container by an injection-molding process.

FIG. 8 depicts an apparatus 800 for manufacturing a container (including an enhancement) by injection molding. In some embodiments, the container may be a bowl. The apparatus includes a mold having a cavity side 801 and core side 802; the trapped cavity space 803 between the two sides defines the shape of the container to be manufactured using the apparatus. The cavity side 801 is the non-moving side of the mold and creates the outside feature of the container. The cavity side 801 includes a gate 805 for entry of the material to be used in making the container. The core side 802 is the moving side of the mold which creates the inside feature of the container; the core side 802 moves up and down in the direction of draw shown on FIG. 8 with a double-headed arrow. Where the cavity side and the core side combine together, they create a parting line 804. In some embodiments, the mold is polished in the same direction as the draw, rather than perpendicular to the direction of the draw. In some embodiments, the apparatus 800 may have a tonnage of between 120 and 250 tons.

To make a container using the apparatus 800, the cavity side 801 and core side 802 are brought together with appropriate force, and material is injected into the trapped cavity space 803 via the gate 805. In some embodiments, the trapped cavity space 803 may be filled to 98% with material and 2% packing pressure. After a suitable period of time (typically, when the material has cooled and solidified, but not yet become rigid), the core side 802 is moved away from the cavity side 801, with the formed container still attached to core side 802. The formed container is then removed from the core side 802.

In some embodiments, the trapped cavity space 803 results in a container having an undercut; an undercut persists when there is a recess or depression in the part that is not perpendicular to the parting line 804. In order to facilitate ejection of the container formed in the apparatus 800 (particularly where an undercut is present in the formed container), the apparatus 800 may (in some embodiments) include at least one air poppet to break the vacuum between the formed container and the core side 802, and thus eject the formed container from the core side 802 of the mold. In some embodiments, the at least one air poppet has an opening that is between 12 mm and 25 mm in diameter. In some embodiments, the at least one air poppet opening is located on the core side 802 opposite to the gate on the cavity side 801. In further embodiments, the at least one air poppet may include multiple openings located throughout the core side 802. The at least one air poppet may have an ejection air pressure greater than or equal to 50 PSI; in some embodiments, it has an ejection air pressure of between 85 and 90 PSI; in further embodiments, it has an ejection air pressure of 87 PSI.

In some embodiments, the apparatus 800 may also include a water cooling system of sufficient capacity. Such a water cooling system can be used to reduce sink marks in the formed container. Sink marks may occur when the formed container does not have a constant wall thickness, and the different sections of the wall thus cool unevenly; thicker sections of wall will cool (and hence, shrink) at a slower rate than the thinner sections of wall. In order to prevent or reduce such non-uniform shrinkage and resulting sink marks, the mold may include water lines to keep a constant temperature in the mold. In some embodiments, the cavity side 801 can be kept at one constant temperature, and the core side 802 can be kept at a different constant temperature. In some such embodiments, the core side 802 is kept at a lower temperature than the cavity side 801. In some embodiments, the core side 802 is kept at a temperature between about 30 and 40° C. and the cavity side 801 is kept at a temperature between about 45 and 55° C.

Figure 9:
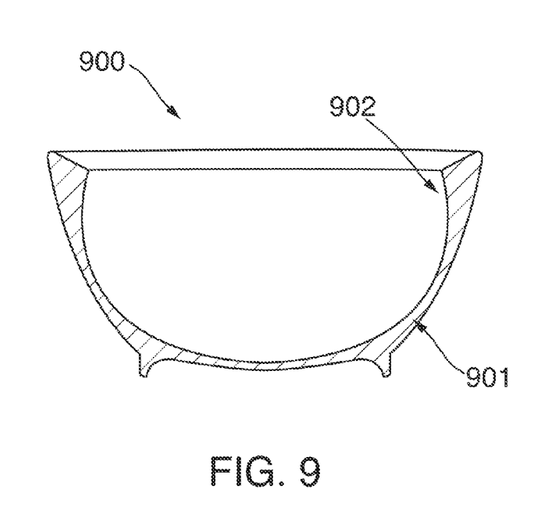
FIG. 9 depicts a diagram of a cross-section of a container including an enhancement.

FIG. 9 depicts a cross-section 900 of a container 901 including an enhancement 902. The container has a substantially horizontal base; in the embodiment shown in FIG. 9, the base has a degree of curvature to it, but it may also be flat. The sides of the container are shaped such that the inner face of the sides has a degree of curvature that is greater than the degree of curvature of the outer face of the sides; in the embodiment shown in FIG. 9, this greater degree of curvature constitutes the enhancement 902 of the container. The enhancement 902 facilitates removal of items placed in the container. In some embodiments, the degree of curvature of the inner face is between about 15 and 120 degrees.

Figure 10A:
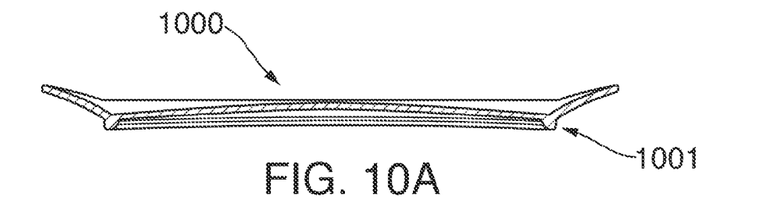
FIG. 10A-10C depict a lid for use in conjunction with a container including an enhancement.
Figure 10B:
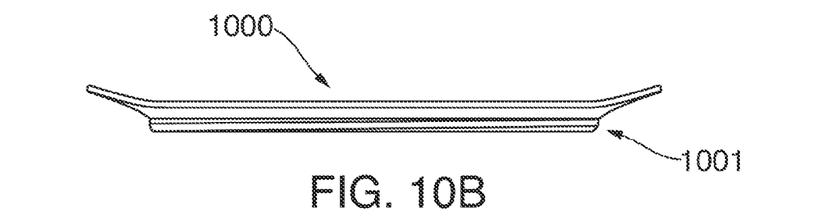
Figure 10C:
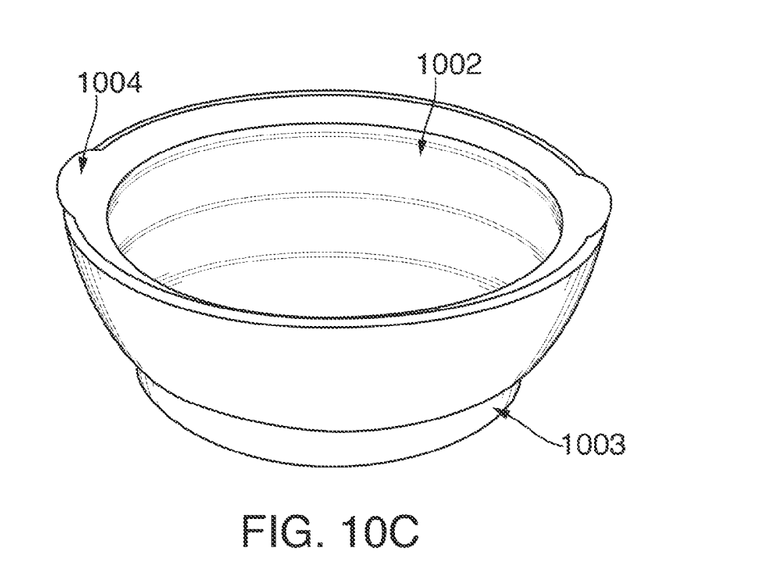

FIG. 10A-10C depict a lid for use in conjunction with a container including an enhancement. FIGS. 10A and 10B depict cross-sections of two embodiments of a lid. FIG. 10A depicts a lid 1000 that has a degree of curvature to its center section. FIG. 10B depicts a lid 1000 that is substantially flat. The lid is shaped such that it latches onto the container around the inner perimeter of the enhancement, rather than around the outside edges of the container (as conventional lids for containers do). Specifically, the lid includes a lip 1001 that engages with an enhancement (such as those depicted in the previous figures), and this engagement of the lip 1001 latches the lid onto the container. FIG. 10C depicts a perspective view of a lid 1002 latched onto a container 1003 (for clarity, the container 1003 is shown in darker color than the lid 1002). In some embodiments, the lid includes handles 1004 to facilitate removal of the lid from the container. As is shown in the perspective view, when the lid 1002 is latched onto the container 1003, the entire perimeter of the container is visible (except where obscured by the handles 1004); this feature facilitates visual confirmation that the lid 1002 is properly latched onto the container 1003, and thus minimizes the risk of spillage resulting from an improperly or incompletely latched-on lid. In the embodiments shown in FIG. 10C, the diameter of the lid 1002 (except for the handles 1004) is smaller than the overall diameter of the container 1003, but since the lid engages with the enhancement of the container 1003 and the diameter of the lip 1001 of the lid 1002 is slightly greater than the diameter of the opening of the container 1003, an effective closure is still attained.

As used herein, the term "embodiment" means an embodiment that serves to illustrate by way of example but not limitation. It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A container comprising:
    a base;
    a substantially circular wall extending from the base of the container having an inside surface and an outside surface, wherein the inside surface of the wall is smooth and uninterrupted between the base of the container and an end opposite the base wherein the wall has a thickness that varies between the base of the container and the end opposite the base such that the wall has a first thickness closest to the base, a second thickness further away from the base, and a third thickness farthest from the base, wherein the inside surface of the wall has a greater degree of curvature than the outside surface of the wall; and an enhancement means attached to the wall at the end opposite the base, wherein the enhancement means and the outside surface of the wall form a smooth and uninterrupted surface, wherein the enhancement means is substantially circular and uniform around a perimeter, wherein the enhancement means is inwardly tapered causing a substance within the container to fall back onto an object when the object is slide against the inside surface of the wall and the enhancement means.

2. The container of claim 1, wherein the container comprises at least one material from the group consisting of: polyethylene, polypropylene, titanium dioxide, mineral filler, polypropylene, ceramic, glass, tin, aluminum, steel, cast-iron, and wood.

3. The container of claim 1, wherein the container is manufactured by injection molding.

4. The container of claim 1, further comprising a lid configured to snap onto the container.

5. The container of claim 1, further comprising a lid configured to latch onto an inner perimeter of the enhancement means.

6. The container of claim 5, wherein the lid is curved.

7. The container of claim 5, wherein the lid is flat.

8. The container of claim 5, wherein the lid comprises at least one handle.

* * * * *